(12) United States Patent
Ravid (10) Patent No.: US 9,002,842 B2
(45) Date of Patent: Apr. 7, 2015

(54) SYSTEM AND METHOD FOR COMPUTERIZED BATCHING OF HUGE POPULATIONS OF ELECTRONIC DOCUMENTS

(75) Inventor: Yiftach Ravid, Rosh Haayin (IL)

(73) Assignee: Equivio Ltd., Rosh Haayin (IL)

( * ) Notice: Subject to any disclaimer, the term of this patent is extended or adjusted under 35 U.S.C. 154(b) by 319 days.

(21) Appl. No.: 13/569,752

(22) Filed: Aug. 8, 2012

(65) Prior Publication Data

US 2014/0046942 A1 Feb. 13, 2014

(51) Int. Cl.
*G06F 17/30* (2006.01)

(52) U.S. Cl.
CPC ................................ *G06F 17/3071* (2013.01)

(58) Field of Classification Search
CPC .................................................. G06F 17/30598
USPC ................... 707/737, 736, 740, 749
See application file for complete search history.

(56) References Cited

U.S. PATENT DOCUMENTS

| | | | |
|---|---|---|---|
| 4,839,853 A | 6/1989 | Deerwester et al. | |
| 5,924,097 A * | 7/1999 | Hill et al. ....................... | 707/703 |
| 6,519,586 B2 | 2/2003 | Anick et al. | |
| 6,687,696 B2 | 2/2004 | Hofmann et al. | |
| 6,738,760 B1 | 5/2004 | Krachman | |
| 6,850,252 B1 | 2/2005 | Hoffberg | |
| 7,171,426 B2 | 1/2007 | Farmer et al. | |
| 7,328,216 B2 | 2/2008 | Hofmann et al. | |
| 7,376,635 B1 | 5/2008 | Porcari et al. | |
| 7,558,778 B2 | 7/2009 | Carus et al. | |
| 7,657,522 B1 | 2/2010 | Puzicha et al. | |
| 7,933,859 B1 | 4/2011 | Puzicha et al. | |
| 8,620,842 B1 | 12/2013 | Cormack | |
| 8,713,023 B1 | 4/2014 | Cormack et al. | |
| 8,880,725 B2 * | 11/2014 | Ananthanarayanan et al. ............................ | 709/238 |
| 2002/0007283 A1 | 1/2002 | Anelli | |
| 2003/0120653 A1 | 6/2003 | Brady et al. | |
| 2004/0003038 A1 * | 1/2004 | Huang et al. ................... | 709/204 |
| 2004/0049513 A1 * | 3/2004 | Yakir et al. .................... | 707/100 |
| 2004/0064335 A1 * | 4/2004 | Yang ................................. | 705/1 |
| 2005/0027664 A1 | 2/2005 | Johnson et al. | |
| 2005/0134935 A1 * | 6/2005 | Schmidtler et al. ........... | 358/448 |

(Continued)

FOREIGN PATENT DOCUMENTS

| WO | WO 2006/008733 A2 | 1/2006 |
|---|---|---|
| WO | WO 2007/086059 A2 | 8/2007 |

OTHER PUBLICATIONS

Rennie, Jason D.M., "Derivation of the F-Measure", MIT, Feb. 19, 2004.

(Continued)

*Primary Examiner* — Noosha Arjomandi
(74) *Attorney, Agent, or Firm* — Oliff PLC (57) ABSTRACT

A method for computerized batching of huge populations of electronic documents, including computerized assignment of electronic documents into at least one sequence of electronic document batches such that each document is assigned to a batch in the sequence of batches and such that there is no conflict between batching requirements, the following batching requirements being maintained by a suitably programmed processor: a. pre-defined subsets of documents are always kept together in the same batch, b. batches are equal in size, c. the population is partitioned into clusters, and all documents in any given batch belong to a single cluster rather than to two or more clusters.

24 Claims, 4 Drawing Sheets

(56) References Cited

U.S. PATENT DOCUMENTS

| | | | |
|---|---|---|---|
| 2006/0047649 A1 | 3/2006 | Liang | |
| 2006/0242190 A1 | 10/2006 | Wnek | |
| 2006/0294101 A1 | 12/2006 | Wnek | |
| 2007/0156615 A1* | 7/2007 | Davar et al. | 706/15 |
| 2008/0077570 A1* | 3/2008 | Tang et al. | 707/5 |
| 2008/0086433 A1 | 4/2008 | Schmidtler et al. | |
| 2008/0104060 A1* | 5/2008 | Abhyankar et al. | 707/5 |
| 2009/0083200 A1* | 3/2009 | Pollara et al. | 706/14 |
| 2009/0119240 A1* | 5/2009 | Fleming et al. | 706/46 |
| 2009/0119343 A1 | 5/2009 | Jiao et al. | |
| 2009/0164416 A1 | 6/2009 | Guha | |
| 2010/0250474 A1 | 9/2010 | Richards et al. | |
| 2010/0293117 A1* | 11/2010 | Xu | 706/12 |
| 2012/0310935 A1* | 12/2012 | Puzicha | 707/737 |
| 2013/0262465 A1* | 10/2013 | Galle et al. | 707/737 |

OTHER PUBLICATIONS

Bassan, B. et al., "Parameter Estimation in Differential Equations, using Random Time Transformations," *Journal of the Italian Statistical Society*, Oct. 13, 2009, pp. 177-199.

"Supervised learning," *Wikipedia*, retrieved Aug. 19, 2009, http://en.wikipedia.org/wiki/Supervised_learning.

Draper, N.R. et al., *Applied Regression Analysis*, Third Edition, Wiley, Apr. 23, 1998, pp. 236 and 238.

Mendenhall, W. et al., *A Second Course in Regression Analysis*, Seventh Edition, 2012, Prentice-Hall.

*The Sedona Conference Journal*, vol. 8, Fall 2007, pp. 189-223.

"Electronic Discovery Software," *ImageMAKER Discovery Assistant*, retrieved Aug. 9, 2009, http://www.discoveryassistant.com/Nav_Top/Product_Description.asp.

"Multilingual E-Discovery," *BASIS Technology*, retrieved Aug. 9, 2009, http://www.basistech.com/ediscovery/?gclid=CNDZr5v71ZwCFd0B4wodSznYew.

"Electronic Discovery Software," *Bitpipe*, retrieved Aug. 9, 2009, http://www.bitpipe.com/rlist/term/Electronic-Discovery-Software.html.

"Electronic Discovery Product: The Clearwell E-Discovery Platform," *Clearwell*, retrieved Aug. 19, 2009, http://www.clearwellsystems.com/products/index.php.

Peterson, M., "Electronic Discovery Software," retrieved Aug. 9, 2009, http://ezinearticles.com/?Electronic-Discovery-Software&id=222396.

"Autonomy's Products," retrieved Apr. 9, 2009, http://www.autonomy.com/.

Joachims, T., "Transductive Inference for Text Classification Using support Vector Machines," *Proceedings of the 16th International Conference on Machine Learning*, 1999.

Deerwester, S. et al., "Indexing by Latent Semantic Analysis," *Journal of the American Society for Information Science* (1986-1998), Sep. 1990, p. 391, vol. 41, No. 6.

Joachims, T., *Learning to Classify Text Using Support Vector Machines: Methods, Theory and Algorithms*, Feb. 2001, Kluwer Academic Publishers.

"Learning to rank," *Wikipedia*, retrieved Apr. 9, 2012, http://en.wikipedia.org/wiki/Learning_to_rank.

"Costly Review Effort in the Context of Documentation Retention Policy Becomes Streamlined, Automated Review System," *H5 Technologies*, Feb. 2005, retrieved Apr. 9, 2012, http://wayback.archive.org/web/jsp/Interstitial.jsp?seconds=5&date=1108350529000&url=http%3A%2F%2Fwww.h5technologies.com%2Fwhatwedo%2Fexample3.html&target=http%3A%2F%2Fweb.archive.org%2Fweb%2F20050214030849%2Fhttp%3A%2F%2Fwww.h5technologies.com%2Fwhatwedo%2Fexample3.html.

"Rosette for E-Discovery," *Basis Technology*, retrieved Apr. 9, 2012, http://www.basistech.com/e-discovery/?gclid=CNDZr5v7IZwCFd0B4wodSznYew.

"Industry Leading E-Discovery Product: Clearwell E-Discovery Platform," *Clearwell*, retrieved Apr. 9, 2012, http://www.clearwellsystems.com/electronics-discovery-products/.

Trice, A. et al., "Consensus Knowledge Acquisition," *AI Meme* No. 1183, Dec. 1989, pp. 1-24.

Kittler, J. et al, "Fusion of Multiple Experts in Multimodal Biometric Personal Identity Verification Systems," IEEE, 2002, pp. 3-12.

Liao, S., "Expert system methodologies and applications—a decade review from 1995 to 2004," *Expert Systems with Applications*, 2008, No. 28, pp. 93-103.

Li, B. et al, "Confidence-based Dynamic Ensemble for Image Annotation and Semantics Discovery," *ACM MM*, Nov. 2003, pp. 195-206.

Goncalves, T. et al., "Is linguistic information relevant for the classification of legal texts?", *ACM ICAIL*, Jun. 2005, pp. 168-176.

Apr. 12, 2012 Office Action issued in U.S. Appl. No. 12/428,100.
Jan. 9, 2012 Office Action issued in U.S. Appl. No. 13/161,087.
Jun. 27, 2012 Office Action issued in U.S. Appl. No. 12/559,173.
Mar. 28, 2013 Notice of Allowance issued in U.S. Appl. No. 12/559,173.

\* cited by examiner

```
┌─────────────────────────────────────────────────────────────┐
│   For each electronic document population to be electronically batched, │
│     input, per document in the population, Doc ID; keepTogether ID      │
│     associating the document with a set to be kept together, clusterID  │
│     indicating metadata which should be uniform over each individual    │
│     batch, and Score indicating reading priority of the document. May   │
│        store e.g. in the form of a first table in computer storage      │
└─────────────────────────────────────────────────────────────┘
                                  ↓                          ~10
┌─────────────────────────────────────────────────────────────┐
│  Use processor to compute or otherwise provide some or all of the       │
│    following computerized parameters, for each keep-together set:       │
│    a. keepTogether ID:  ID of the keep-together set;                    │
│    b. keepTogether Size: (depending on metric) such as but not          │
│  limited to: Number of documents having the same keepTogether ID i.e.   │
│  number of members of the current keep-together set, especially if the  │
│  documents are equal or similar in size; c. keepTogether ClusterID:     │
│  The ClusterID shared by the largest subset of documents in             │
│  the current keep-together set (or a central tendency of the clusterIDs │
│  other than mode e.g. median or mean);                                  │
│    d. keepTogetherScore: The MAX/AVG/MEDIAN of the scores of the        │
│  documents that have the same keep-together set. Maximum values are     │
│  those which are most important hence desired to be in early-positioned │
│             batches rather than in later-positioned batches.            │
│    e. RowID: the ID of the row in which the current keep-together set   │
│  resides, if the second table is sorted by keepTogetherScore (parameter │
│  d above). The first row represents the keep-together set which is most │
│  important hence most needs to be in an early batch, whereas the last   │
│  row represents the keep-together set which is least important hence    │
│  least needs to be in an early batch and can be in the last batch. May  │
│        store e.g. in the form of a second table in computer storage     │
└─────────────────────────────────────────────────────────────┘
                                  ↓                          ~20
┌─────────────────────────────────────────────────────────────┐
│   Perform computerized Search e.g. in the second table in computer      │
│  storage, for large keep-together sets whose Size exceeds a threshold   │
│    batch size. Set a unique, typically arbitrary, bucketID for each such│
│                        large keep-together set.                         │
└─────────────────────────────────────────────────────────────┘
                                  ↓                          ~30
┌─────────────────────────────────────────────────────────────┐
│          For each keepTogether ClusterID, perform steps 50 - 80         │
└─────────────────────────────────────────────────────────────┘
                                  ↓                          ~40
                            to step 50
                            of Fig. 1B        Fig. 1A
```

Fig. 1B

| KeepTogetherID | RowID (from most to least important) | keepTogetherScore | keepTogether Size | Bucket ID | Outcomes |
|---|---|---|---|---|---|
| 80 | 10 | 90 | 490 | 1 | Add, bucket size is 490 |
| 160 | 13 | 89 | 489 | 2 | Can't add, bucket1 is too full; start new bucket2 |
| 47 | 15 | 88 | 75 | 3 | Can't add, bucket2 is too full; start new bucket |
| 529 | 20 | 70 | 10 | 3 | Add, bucket size is 85 |
| 631 | 26 | 60 | 59 | 3 | Add, bucket size is 144 |
| 4 | 30 | 58 | 490 | 4 | Can't add, bucket3 is full; start new bucket4 |

Fig. 2

| KeepTogetherID | Document ID | EquiSet ID | Cluster ID | keepTogether ClusterID |
|---|---|---|---|---|
| 1 | 100 | 100 | 1 | 1 |
| 1 | 101 | 100 | 1 | 1 |
| 1 | 102 | 100 | 1 | 1 |
| 1 | 103 | 100 | 2 | 1 |
| 1 | 104 | 100 | 3 | 1 |
| 1 | 105 | 100 | 4 | 1 |
| 1 | 106 | 100 | 5 | 1 |
| 1 | 107 | 100 | 6 | 1 |
| 1 | 108 | 100 | 7 | 1 |
| 1 | 109 | 100 | 8 | 1 |

Fig. 3

SYSTEM AND METHOD FOR COMPUTERIZED BATCHING OF HUGE POPULATIONS OF ELECTRONIC DOCUMENTS

REFERENCE TO CO-PENDING APPLICATIONS

The following applications are co-pending: US-2010-0150453, US-2010-0198864, Ser. Nos. 12/839,976; 12/428,100; 12/559,173; 13/161,087 and 13/342,770.

FIELD OF THIS DISCLOSURE

The present invention relates generally to electronic documents and more particularly to computerized processing thereof.

BACKGROUND FOR THIS DISCLOSURE

Equivio>Relevance is a computerized tool commercially available from Equivio which is operative to facilitate determinations of relevance e.g. to a legal case for which computerized discovery is being performed; such relevance determinations are particularly important in prioritizing review of such documents, since relevant, hence important documents can then be reviewed before less relevant, hence less important documents can be reviewed later, if at all.

Equivio>Extract is a computerized tool commercially available from Equivio (equivio.com, or 22 Hamelacha St., PO Box 11354, Rosh Haayin, 48091 Israel) for assigning keep-together values to documents thereby to generate "keep-togethers" i.e. sets of documents to be batched together.

Equivio>Near Duplicate is a computerized system commercially available from Equivio which is operative for identifying near-duplicate documents.

Relativity is a review system available via the following website: kCura.com. The system has a feature operative for generating batches of documents, of uniform size. If desired, certain pre-defined subsets of documents may be kept together in a single batch.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a method for partitioning a collection of documents into batches of documents, given a set or collection of documents, each having associated therewith some or all of the following values:

1. Doc ID: a unique identifier for the document
2. keepTogether ID: if two documents have the same value they should be in the same batch
3. clusterID: if two documents have the same value they share the same metadata such as but not limited to clustering by content, custodian, date range, etc.
4. Score: each document has a score; suppose document $x1$ has score $r1$ and document $x2$ has score $r2$, if $r1>r2$ then $x1$ is more relevant than $x2$.
   A keepTogetherClusterID value may be defined by selecting the largest of the ClusterID values of all documents that have the same keepTogetherID, e.g. the clusterId that appears most (mode) for a given keepTogetherID.

Typically, a batchID is assigned to each documents such that some or all of the following hold:
   All documents that have the same batchID have the same KeepTogetherID
   All documents that have the same batchID have the same keepTogetherClusterID
   If $doc\_1$ in $batchId\_1$ and $doc\_2$ in $batchId\_2$ and $batchId\_1 < batchId\_2$ then the maximum or average or median Score in $batchedId\_1 >= $ MAX(/AVG/MEDIAN) Score in $batchId\_2$
   If the documents in batchID do not share a single keepTogether ID the size of the batch is maximum cluster size.

According to one embodiment, the system is operative to separate and allocate the population of relevant documents into batches for review, all batches including the same number of documents.

Documents are batched, up to the point of a predetermined maximum batch size threshold. Groups of n documents are assigned to a new batch rather than to an existing batch if the additional n documents would cause the existing batch to exceed the threshold.

According to one embodiment, virtual buckets are filled (documents are assigned to virtual buckets), using a method described herein, and each filled bucket is then deemed a batch. Batches are prioritized according to the known importance or urgency to review documents therewithin e.g. by assigning a priority grade e.g. a number, to each filled bucket (batch).

Certain embodiments of the present invention seek to provide a method for batching huge populations of scored documents, typically including sequencing the resulting batches, thereby to facilitate expert review thereof. Each population may include e.g. millions of documents pertaining to a particular project or endeavor, e.g. a court case. The method may employ a computerized batching system which includes (a) computerized batching functionality according to batching requirements which are advantageous, albeit sometimes mutually contradictory; cooperating with (b) an artificial intelligence component for resolving conflict between the sometimes mutually contradictory batching requirements.

Certain embodiments of the present invention seek to provide a method for batching documents such that all criteria are equal e.g. in the absence of conflict between batching requirements, some or all of the following batching requirements are maintained, and in the event of conflict between the batching requirements, the conflict is resolved as per predefined priorities between the requirements, the batching requirements being:

a. certain pre-defined subsets of documents are always kept together in the same batch; these sub-sets are typically identified by a keep-together value assigned to each document such that a plurality of documents are all assigned a uniform keep-together value if, and only if, said documents are always to be kept together in the same batch. For example, if 1 million documents are assigned 1 million unique keep-together values, this means that there are NO requirements to batch any pair or larger subset of documents together. For example, all documents which were originally "zipped" (compressed) together, might be kept together e.g. by automatically or manually assigning to all such documents a single keep-together value, and/or, all documents which were originally attached to a single email, might be kept together e.g. by automatically or manually assigning to all such documents a single keep-together value. and/or all documents deemed near-duplicates might be kept together e.g. by automatically or manually assigning to all such documents a single keep-together value and/or all emails in a single "thread" might be kept together e.g. by automatically or manually assigning to all such documents a single keep-together value.

b. the population is partitioned into clusters and all documents in any given batch belong to but a single cluster rather than to two or more clusters. For example, a cluster might include all documents pertaining to a certain topic such as sport. Other clusters might include documents pertaining to biology or art. This would facilitate document review because all documents in any given batch would pertain to a single topic or context, rather than to two or more such, and therefore, a single reviewer who is an expert in that topic, can review that batch, as opposed to less sophisticated batching processes, in which one batch may suffer from context switching (may include documents pertaining to several topics e.g. both sport and biology), making it difficult for a reviewer with a single area of expertise (sport or biology but not both) to review any particular batch. Another example is that a cluster might include all documents pertaining to a certain period e.g. tax year. Other clusters might include documents pertaining to other tax years. Another example is that a cluster might include all documents found under the auspices of an individual custodian such as the CFO of a company whose documents are being reviewed. Other clusters might include documents found under the auspices of other custodians such as various engineers, secretaries or sales people in the company.

Alternatively, clustering of the population may be defined other than by partitioning. e.g. one document may belong to more than one cluster simultaneously.

It is appreciated that the examples of clusters listed above may alternatively be used to define keep-together sets (or, if ordinal, to define scores) and vice versa, the examples of keep-together sets listed above may alternatively be used to define clusters (or, if ordinal, to define scores). For example, the keepTogetherClusterID may be defined as the cluster that appears most for a given keepTogetherID.c. descending order of relevance: the output of the method includes a sequence of batches and position of each document within the sequence is determined by the document's relevance e.g. highly relevant documents appear in early batches and less relevant documents appear in later batches.

d. batches are equal in size e.g. all batches include the same number of documents, such as perhaps 100 documents. It is appreciated that other criteria or metrics for batch size, e.g. total number of pages or total number of alphanumeric characters or bytes, may alternatively be employed.

When computing the keepTogether Size the total number of documents that have the same keepTogetherID (assuming equal-sized documents) may be summed.or, it the metric is the number of pages, the total number of pages in documents that have the same keepTogetherID may be computed, or if a kB-based metric is employed, for each documents the size in (say) Kb is computed, and the keepTogether set size is then the total i.e. sum of individual documents sizes in KB. In general, determination e.g. computation of keepTogether Size is of course metric-dependent and determining keepTogether Size by determining the number of (typically known to be equal-sized) documents having the same keepTogether ID, i.e. number of members of the current keep-together set, is merely one possible example of such a determination, assuming one possible metric.

The batching method herein may operate in accordance with any suitable prioritization or compromise scheme between the above requirements. For example, requirement (a) (keep-together) may take precedence over (d) (equal size) in which case documents with a uniform keep-together value may be assigned to a single batch even if that batch has far more documents than a predetermined batch-size e.g. a batch with 280 documents all sharing the same keep-together value may be defined even if all other criteria are equal, the number of documents in each batch equals, say, 100, or does not exceed 100. More complex requirements may be defined as well e.g. documents with a uniform keep-together value are kept together unless their number is huge e.g. half a million documents.

Another example is that requirement (a) (keep-together) may take precedence over the requirement, in (b), that each batch include only documents belonging to a single cluster. To implement this, an artificial intelligence functionality may be provided which uniformizes the cluster id's of all documents having a single keep-together id. For example, the artificial intelligence functionality may define the cluster id's of all documents for which keep-together id=5, as the most common cluster id in the set of documents for which id=5. Alternatively, the cluster id's of all documents for which keep-together id=5, may be defined as the average or mode of the cluster id's in the set of documents for which id=5. The artificial, uniformized cluster id thus imposed is termed herein the "keepTogether cluster id".

Another example is that a maximum batch size may be used as a criterion to ensure that batches do not exceed a maximum number of documents. Another parameter may be used as a criterion to ensure that batches include at least a minimum number of documents, either universally or barring certain predetermined overriding circumstances.

Batching typically comprises assigning a batch id to each document, and then routing all documents in accordance with their batch id. For example, all documents with batch id=1 might be emailed to expert1, cc supervisor, all documents with batch id=2 might be emailed to expert2, cc supervisor, and so forth.

In accordance with an aspect of the presently disclosed subject matter, there is thus provided a method for computerized batching of huge populations of electronic documents, including computerized assignment of electronic documents into at least one sequence of electronic document batches such that each document is assigned to a batch in the sequence of batches and such that absent conflict between batching requirements, the following batching requirements being maintained by a suitably programmed processor:

a. pre-defined subsets of documents are always kept together in the same batch b. batches are equal in size c. the population is partitioned into clusters and all documents in any given batch belong to a single cluster rather than to two or more clusters.

In accordance with an aspect of the presently disclosed subject matter, there is further provided a method for computerized batching of huge populations of electronic documents, including computerized assignment of documents into at least one sequence of electronic document batches such that each document is assigned to a batch in the sequence of batches and such that absent conflict between batching requirements, the following batching requirements being maintained by a suitably programmed processor:

a. pre-defined subsets of documents are always kept together in the same batch b. batches are equal in size c. positions of documents within the sequence of batches are determined by the document's pre-known urgency for review such that highly urgent e.g. highly relevant documents appear in early batches and less urgent e.g. less relevant documents appear in later batches.

In accordance with an embodiment of the presently disclosed subject matter, there is further provided a method wherein absent conflict between batching requirements, the following batching requirement being also maintained: positions of documents within the sequence of batches are determined by the document's pre-known urgency for review such that highly urgent e.g. highly relevant documents appear in early batches and less urgent e.g. less relevant documents appear in later batches.

In accordance with an embodiment of the presently disclosed subject matter, there is further provided a method comprising computing an urgency score for at least one keep-together set which represents an attribute such as a central tendency of the urgency scores of all documents in the keep-together set.

In accordance with an embodiment of the presently disclosed subject matter, there is further provided a method comprising filling batches, separately for each of several clusters, including first using large keep-together sets as batches and then combining keep-together sets other than the large sets into batches and finally ordering the resulting batches into a sequence according to urgency.

In accordance with an embodiment of the presently disclosed subject matter, there is further provided a method comprising filling batches, separately for each of several clusters, including first combining keep-together sets other than very small sets into batches and subsequently passing over the batches in an order determined by known urgency and enlarging at least some of the batches by adding the very small sets thereto, in the order determined by known urgency.

In accordance with an embodiment of the presently disclosed subject matter, there is further provided a method wherein the very small sets comprise keep-together sets including only a single document.

In accordance with an embodiment of the presently disclosed subject matter, there is still further provided a method wherein the urgency score of the set comprises a mode (most frequently occurring) urgency score of all documents in the set.

In accordance with an embodiment of the presently disclosed subject matter, there is still further provided a method wherein requirement (a) (keep-together) takes precedence over (b) (equal size) such that documents with a uniform keep-together value are assigned to a single batch regardless of resulting size of the batch.

In accordance with an embodiment of the presently disclosed subject matter, there is still further provided a method wherein requirement (a) (keep-together) takes precedence over requirement (c)—that each batch include only documents belonging to a single cluster—in that an artificial intelligence functionality uniformizes the cluster id's of all documents having a single keep-together id.

In accordance with an embodiment of the presently disclosed subject matter, there is still further provided a method wherein due to conflict between requirements (b), (c), there is for at least one cluster, a batch of lesser size than other batches equal in size.

In accordance with an embodiment of the presently disclosed subject matter, there is still further provided a method wherein, due to conflict between requirements (a), (b), there is at least one batch of greater size than other batches equal in size.

In accordance with an embodiment of the presently disclosed subject matter, there is still further provided a method wherein, due to conflict between requirements (a), (b), there is at least one batch of greater size than other batches equal in size.

In accordance with an embodiment of the presently disclosed subject matter, there is still further provided a method comprising computing an urgency score for at least one keep-together set which represents an attribute such as a central tendency of the urgency scores of all documents in the keep-together set.

In accordance with an embodiment of the presently disclosed subject matter, there is still further provided a method and also comprising filling batches, separately for each of several clusters, including first using large keep-together sets as batches and then combining keep-together sets other than the large sets into batches and finally ordering the resulting batches into a sequence according to urgency.

In accordance with an embodiment of the presently disclosed subject matter, there is still further provided a method comprising filling batches, separately for each of several clusters, including first combining keep-together sets other than very small sets into batches and subsequently passing over the batches in an order determined by known urgency and enlarging at least some of the batches by adding the very small sets thereto, in the order determined by known urgency.

In accordance with an embodiment of the presently disclosed subject matter, there is still further provided a method wherein the very small sets comprise keep-together sets including only a single document.

In accordance with an embodiment of the presently disclosed subject matter, there is still further provided a method wherein the urgency score of the set comprises a mode (most frequently occurring) urgency score of all documents in the set.

In accordance with an embodiment of the presently disclosed subject matter, there is still further provided a method wherein requirement (a) (keep-together) takes precedence over (b) (equal size) such that documents with a uniform keep-together value are assigned to a single batch regardless of resulting size of the batch.

In accordance with an embodiment of the presently disclosed subject matter, there is still further provided a method wherein requirement (a) (keep-together) takes precedence over requirement (c)—that each batch include only documents belonging to a single cluster—in that an artificial intelligence functionality uniformizes the cluster id's of all documents having a single keep-together id.

In accordance with an aspect of the presently disclosed subject matter, there is still further provided a system for computerized batching of huge populations of electronic documents, the system including:

apparatus for computerized assignment of documents into at least one sequence of batches; and a processor for controlling the computerized assignment such that each document is assigned to a batch in the sequence of batches and such that there is no conflict between batching requirements, the following batching requirements being maintained:

a. pre-defined subsets of documents are always kept together in the same batch b. batches are equal in size c. the population is partitioned into clusters and all documents in any given batch belong to a single cluster rather than to two or more clusters.

In accordance with an aspect of the presently disclosed subject matter, there is still further provided a system for computerized batching of huge populations of electronic documents, the system including:

apparatus for computerized assignment of documents into at least one sequence of batches; and a processor for controlling the computerized assignment such that each document is assigned to a batch in the sequence of batches and such that in the absence of conflict between batching requirements, the following batching requirements are maintained:

a. pre-defined subsets of documents are always kept together in the same batch b. batches are equal in size c. positions of documents within the sequence of batches are determined by the document's pre-known urgency for review such that highly urgent e.g. highly relevant documents appear in early batches and less urgent e.g. less relevant documents appear in later batches.

Also provided, excluding signals, is a computer program comprising computer program code means for performing any of the methods shown and described herein when said program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-1b, taken together, constitute a simplified flowchart illustration of a method for computerized batching of electronic documents, according to certain embodiments of the present invention.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1B:
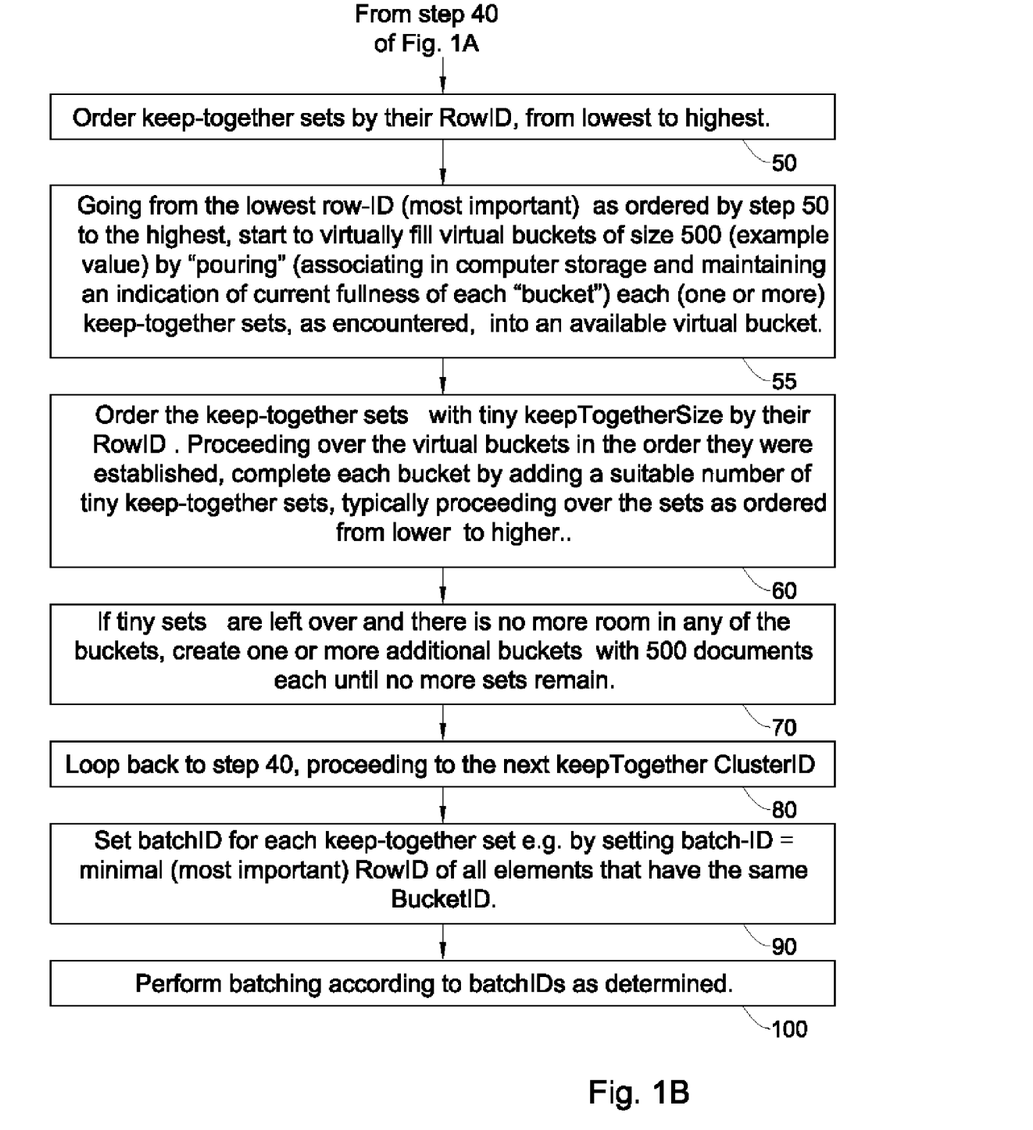

Reference is now made to FIGS. 1a-1b which, taken together, constitute a simplified flowchart illustration of a method for computerized batching of electronic documents, according to certain embodiments of the present invention. In practice, some or all of the steps shown may be provided, suitably ordered e.g. as shown. The steps of FIGS. 1a-1b are now described in detail:

Step 10: for each document population to be batched, input, per document in the population, some or all of the following computerized values:

1. Doc ID: a unique identifier for the document
2. keepTogether ID: if two documents have the same computerized value for this parameter, they should be in the same batch
3. clusterID: if two documents have the same computerized value for this parameter, they share the same metadata, which should be uniform over each individual batch. An example could be clustering by content, custodian, or date range, e.g. such that each batch includes only documents which have a uniform content domain and/or custodian and/or date range.
4. Score: if document x1 has a score of r1 and document x2 has a score of r2, then if r1>r2 then x1 is (say) more relevant than x2 to a particular issue. Alternatively, x1 might have a higher business confidentiality classification than, or be shorter than, or have a more recent date than, or be authored by someone more senior than, document x2. The score may represent any ordinal quality, or a predetermined logical or computational combination of such, which may determine that the document having a higher value thereof, should be read before documents having a lower value thereof.

Typically, this data is stored in the form of a first table whose number of rows (entries) equals the number of documents in the population, say one or several or many millions.

Step 20: Compute some or all of the following computerized parameters, for each keep-together set (each set of documents in the first table which shares a uniform keep-together id):

a. keepTogether ID: the ID of the keep-together set
b. keepTogether Size: Depends on the metric used for size. For example, the number of documents having the same keepTogether ID i.e. number of members of the current keep-together set may be computed. Alternatively however any other suitable document size metric may be employed such as the number of documents in a given batch, the total number of pages or lines or words, or total size in bytes. A document content complexity metric other than size may also be employed e.g. the number of drawings, number of tables, number of links, as well as any suitable combination of the above metrics.
c. keepTogether ClusterID: The ClusterID shared by the largest subset of documents in the current keep-together set (or a central tendency of the clusterIDs other than mode e.g. median or mean).
d. keepTogetherScore: The MAX/AVG/MEDIAN of the scores of the documents that have the same keep-together set. Maximum values are those which are most important hence desired to be in early-positioned batches rather than in later-positioned batches.
e. RowID: the ID of the row in which the current keep-together set resides, if the second table is sorted by keepTogetherScore (parameter d above). The first row represents the keep-together set which is most important hence most needs to be in an early batch, whereas the last row represents the keep-together set which is least important hence least needs to be in an early batch and can be in the last batch.

Typically, this data is stored in the form of a second table whose number of rows (entries) equals the number of keep-together sets, say, perhaps 1/10 or 1/4 or 1/2 of the total number of documents in the population.

Step 30: Search the second table for large keep-together sets whose size exceeds a threshold batch size such as 100 or 500 or 1000 documents. Set a unique, typically arbitrary, bucketID for each such large keep-together set. If desired, this step may be omitted in which case typically, "buckets"

including a single set of just the right size are simply formed in the natural course of step 55 below.

Step 40: For each keepTogether ClusterID (e.g. first for entries in the second table having a first keepTogether ClusterID value, next for entries in the second table having a second keepTogether ClusterID value, next for entries in the second table having a third keepTogether ClusterID value, and so on), perform steps 50-80:

Step 50: Order the keep-together sets in the second table by their RowID, from lowest to highest. Typically, this step is performed only for medium-size sets e.g. only for those sets whose keepTogetherSize>1 (or another suitable small threshold such as 2 or 3) and <=500 (or other suitable threshold e.g. as stipulated above).

step 55: going from the lowest row-ID (most important) to be ordered by step 50 to the highest, start to fill virtual buckets of size 500 (example value) by "pouring" each (one or more) keep-together sets, as encountered, into an available bucket, typically but not necessarily only into the most recently established bucket and not into earlier buckets even if they still have room, simply due to performance considerations.

Typically, each bucket is poured-into until the bucket is either full or would over-fill if the next keep-together set is poured into (added to) it. Typically, buckets are not allowed to over-fill at all i.e. tolerance for filling over 500 is zero, but this need not necessarily be the case.

Figure 2:
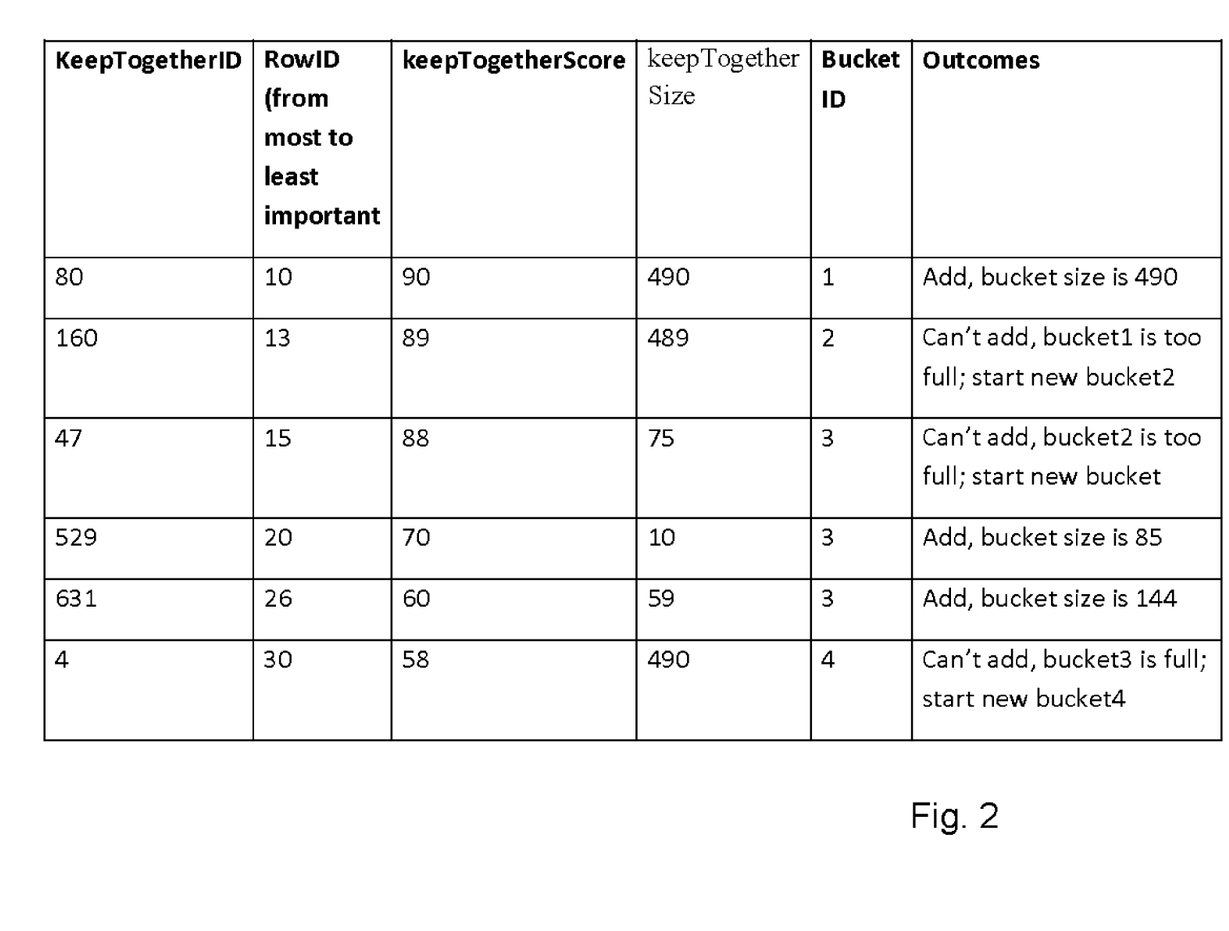
FIG. 2 is a table showing an example of batches generated from a population of documents, in order of scoring, batch size and Cluster ID.

Reference is now made to FIG. 2 which is a table showing an example of batches generated from a population of documents, in order of scoring, batch size and Cluster ID. FIG. 2 is an example of the outcome of proceeding along the first 6 (non-small, non-large) rows of an example instance of the second table; in the illustrated example, 4 buckets are filled or almost filled. It is appreciated that in the illustrated examples, row IDs 11-12, 14, 16-19, 21-25, 27-29 and so on are not present; this is typically because these row IDs correspond to large (e.g. 500) or small (e.g. 1) sets and/or because these row IDs are not in the current cluster ID.

Step 60: Order the keep-together sets with keepTogetherSize=1 (or perhaps also those with slightly larger sizes e.g. 2, 3) by their RowID.

Proceeding over the buckets in the order they were established, complete each bucket by adding a suitable number of keep-together sets of size 1 (optionally, keep-together sets of slightly larger size can be used as well e.g. of size 2 or 3), proceeding over the sets as ordered from lower to higher.
For example
  Add 10 documents (e.g. the 10 most important sets having keepTogetherSize=1) to BucketID 1
  Add 11 documents (e.g. the 11 next most important sets having keepTogetherSize=1) to BucketID 2
  Add 356 documents (e.g. the 356 next most important sets having keepTogetherSize=1) to BucketID 3

Step 70: If left with sets having keepTogetherSize=1 and there is no more room in any of the buckets, create one or more additional buckets with 500 documents each (500 of the next most important sets having keepTogetherSize=1) per bucket, until no more sets remain. The last bucket may have less than 500 documents. It is appreciated that typically, there are many rows with keepTogetherSize=1 e.g. because many documents neither have a family, nor are they part of any e-mail thread or near-duplicate set, nor are they, say, spreadsheets in an Excel file, or slides in a Powerpoint presentation.

The term "family" is used herein to denote a set of documents which have reason to be grouped together such as but not limited to: an Email with its attachments, All files in a single zip, or N documents generated by OCRing an N-page paper document (when OCRing a document, the output often includes a set of N documents, each representing one page).

Step 80: loop back to step 40, proceeding to the next keepTogether ClusterID Step 90: Set batchID for each keep-together set e.g. by setting batch-ID=minimal (most important) RowID of all elements that have the same BucketID. Alternatively, a central tendency RowID representing all elements that have the same BucketID, or all such other than outliers and/or other than keepTogetherSize=1) may be employed. Typically, the output includes at most one batch for each keepTogether ClusterID with less than 500 documents.

Step 100: use a computerized system to perform batching according to batchIDs as determined. For example, after assigning batchID for all documents, a computerized or human system manager may assign batches to each of many reviewers. Typically, when reviewing a large set of documents requiring many viewers the manager assigns documents to an individual reviewer based on the batchID, such that the first reviewer gets the documents with the smallest batchID, the second reviewer gets the next batch of documents with the next smallest batchID, and so forth. The actual assignment process may comprise building a directory in a centralized computer memory for each reviewer, and desposing "his" documents in the directory; transmitting each reviewer's documents automatically to her or him via a computer network e.g. by email, and so on.

Equivio Zoom is an integrated platform for e-discovery analytics and predictive coding which, inter alia, determines documents are relevant to a case and should be sent to attorneys for review. Typically, documents are distributed to a number of attorneys each of whom review some relevant documents.

The Batching functionality shown and described herein e.g. as per some or all of the steps of the method of FIGS. 1a-1b, may for example be operative in conjunction with some or all of the functionalities of Equivio Zoom. This yields a computerized system providing more information to the customer based on types of metadata collected by Zoom, such as but not limited to Near-duplicates, Email threads, Relevance scores and Cluster IDs.

Typically, Batching separates relevant documents e.g. as identified by Equivio Zoom into groups, or batches, for distribution to plural reviewers. Each reviewer receives a batch, all batches typically including a similar number of documents. A suitable default recommended batch size is 500 documents, or some other size between 50 and a few thousand.

Figure 3:
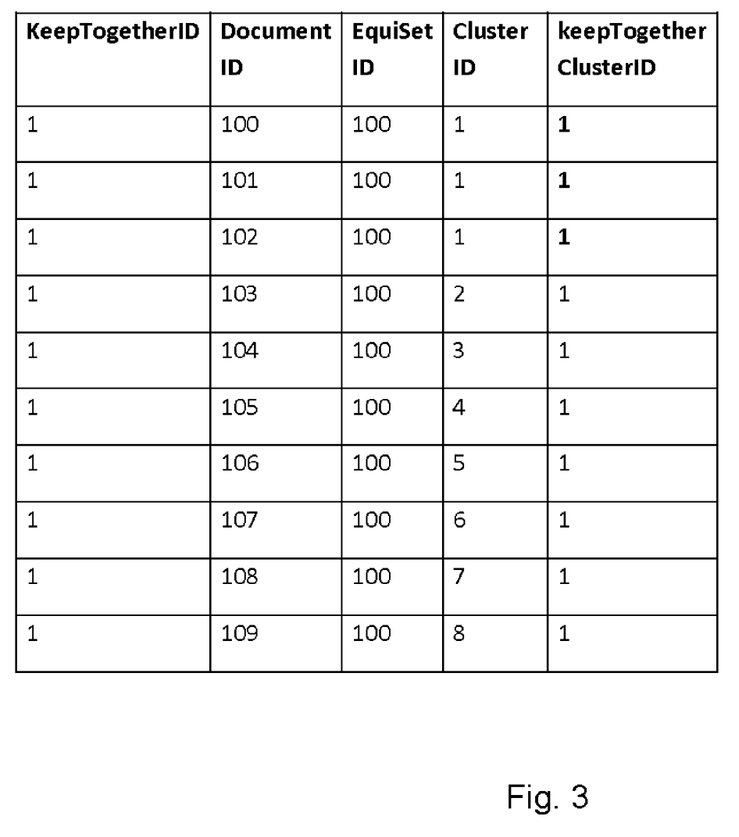
FIG. 3 is a table showing an example of keeping together and extracting documents by Cluster ID, selection being based on frequency of Cluster ID, as shown in the right-hand portion of the first 3 rows in the table of FIG. 3.

Batching e.g. in conjunction with Zoom, is operative to relegate documents that are part of the same EquiSet and EmailSet, to the same batch e.g. as determined and processed in Near-duplicates and Email threads analysis. Clustering information can be used to partition documents according to variables of interest such as but not limited to content, Custodian, dates. When performing Batching in conjunction with Zoom, batches of documents may be generated which are sequenced (e.g. by a priority number per batch) e.g. for electronic distribution to reviewers in order of Relevance scoring. Example: FIG. 3 is an example of keeping together and extracting documents by Cluster ID, selection being based on frequency of Cluster ID, as shown in the right-hand portion of the first 3 rows in the table of FIG. 3.

A particular advantage of certain embodiments is that data to be utilized herein such as some or all of: near duplicates, meta-data characterizing the documents, urgency of documents, clustering of documents, keep-together information re documents; can be received directly from auxiliary computerized systems, as computerized data. Another particular advantage of certain embodiments is that the system shown and described herein can interact with and provide data to a computerized system for delivering batches to reviewers, such as the data indicating membership of documents in batches and data indicating priorities between batches.

Certain embodiments of the present invention may be implemented as a web-based system which employs suitably programmed computers, routers and telecommunications equipment to enable electronic documents to be provided by clients and batched by a server, either physically or virtually as by a cloud configuration.

The methods shown and described herein are particularly useful in batching bodies of knowledge including hundreds, thousands, tens of thousands, or hundreds of thousands of electronic documents or other computerized information repositories, some or many of which are themselves at least tens or hundreds or even thousands of pages long. This is because practically speaking, such large bodies of knowledge can only be processed, analyzed, sorted, or searched using computerized technology.

With respect to identifying documents as near-duplicates e.g. so as to define clusters, and with respect to ensuing processing of near-duplicates, in conjunction with the batching methods shown and described herein, methods for Determining Near Duplicate Data Objects are known and are described e.g. in PCT published Application No. WO 2006/008733. Methods for Determining Near Duplicate "Noisy" Data Objects are also known and are described e.g. in PCT published Application No. WO 2007/086059. Known embodiments described at least in the PCT publications referenced above include the following:

Embodiment 1. A method for determining that at least one object B is a candidate for near duplicate to an object A with a given similarity level th, comprising:
i) providing at least two different functions on an object, each function having a numeric function value;
(ii) determining that at least one objects B is a candidate for near duplicate to an object A, if a condition is met, the condition including: for any function β from among said at least two functions, $|J(A)-TJ(B)|<S_1$ (f,th), wherein δj is dependent upon at least f,th.

Embodiment 2. The method according to Embodiment 1, wherein said objects being documents.

3. The method according to Embodiment 1, wherein for a function/said at least one characteristics being that/is bound by a minimum value min and a maximum value max, and wherein said δ(f,th)=a(th)·\max−min\.

4. The method according to Embodiment 1, wherein for a function/said at least one characteristic being that/is not bound by a minimum value min and a maximum value max, and wherein said δ is also dependent upon A wherein δ(f,th,A)=a(th)'f(A).

5. The method according to Embodiment 2 wherein said documents include at least text and/or numbers.

6. The method according to Embodiment 2 wherein said documents are Microsoft Office® documents.

7. The method according to Embodiment 2, wherein said documents are e-mails in selected format.

8. The method according to Embodiment 7, wherein said format being a member selected from a group that includes Microsoft Outlook, Lotus Notes.

Embodiment 9. The method according to Embodiment 3, wherein a(th)=1-th.

Embodiment 10. The method according to Embodiment 4, wherein a(th)=1-th.

Embodiment 11. The method according to Embodiment $I_5$ wherein at least one of said functions being a classifier.

Embodiment 12. The method according to Embodiment 11, wherein said classifiers being of a classifier type selected from a group that includes Bayesian Classifier, Decision Trees, Support Vector Machine Classifier.

Embodiment 13. The method according to Embodiment 1, wherein at least one of said functions is a distance function.

Embodiment 14. The method according to Embodiment 13, wherein the providing of distance function includes: generating for each document a vector of features where each entry in the vector is the frequency/occurrence of the feature, a feature being words from the documents.

Embodiment 15. The method according to Embodiment 13, wherein said distance function a member of a group that includes: $L^\infty$ (Maximum distance), $L^2$ (Euclidian distance), $L^1$ (sum of differences), and JS (Jensen-Shannon) distance between the two vectors.

Embodiment 16. The method according to Embodiment 2, wherein at least one of said functions being the number of features from known type in a document.

Embodiment 17. The method according to any one of the preceding embodiments, wherein at least two of said functions are of different type.

Embodiment 18. The method according to Embodiment I wherein said (i) and (ii) are applied on-line in respect of each new received object.

Embodiment 19. The method according to Embodiment 1, further comprising: providing a database for storing signatures of objects and determining if an object has already been processed, including:
i) associating to an object a respective unique identification code;
ii) calculating a signature for the object,
iii) checking if the calculated signature is stored in the database in which case the object has already been processed; if not applying said (i) and (ii) in respect of the object and at least one other object in order to determine whether said object and at least one other object are near candidates.

Embodiment 20. The method according to embodiment 19, wherein said signature being checksum on an object or derivative thereof.

Embodiment 21. The method according to embodiment 19, wherein said database being hash table.

Embodiment 22. The method according to Embodiment 1, further comprising applying at least one additional calculation phase in order to determine whether candidates of near duplicate objects meet a criterion for near duplicate objects.

Embodiment 23. The method according to Embodiment 22, wherein the additional calculation phase includes calculating a resemblance between two documents.

Embodiment 24. The method according to Embodiment 22, wherein additional calculation phase includes:
i) calculating intersection between two candidates for near duplicate objects by calculating number of shingles that are shared by the two;
ii) calculating union of two candidates for near duplicate objects by calculating number of shingles that reside in either objects;
iii) determining that the two objects are near duplicate by calculating the resemblance, and in case the result exceeds a predetermined value constituting said criterion, the objects are near duplicate Embodiment 25. The method according to Embodiment 24, further comprising, applying an optimization for discarding candidates for near duplicate objects having a resemblance that drops below said predetermined value.

Embodiment 26. The method according to Embodiment 22, wherein the at least one additional calculation phase is slower than the calculation of candidates of near duplicate documents, for any two documents.

Embodiment 27. The method according to Embodiment 1, further comprising:
i) applying at least one additional calculation phase in order to determine whether candidates of near duplicate objects meet a criterion for near duplicate objects;
ii) applying a learning phase based on objects that are determined to be candidates for near duplicate, but did not meet the criterion for near duplicate objects.

Embodiment 28. The method according to Embodiment 27, wherein said (ii) further comprises (1) providing additional at least one function capable of discerning between objects which were classified as candidates for near duplicate in a first phase, but did not meet said criterion in the additional phase; and
iii) applying (i) and (ii) for determining candidates for near duplicate, for any function from among said at least two functions and the additional at least one function.

Embodiment 29. The method according to Embodiment 28, wherein at least one of said additional functions being a classifier.

Embodiment 30. The method according to any one of the preceding embodiments, further comprising: applying said (i) and (ii) in respect of more than two objects in order to determine whether at least two of said objects are near duplicate.

Embodiment 31. The method according to Embodiment 2, for use in one or more members of the group that includes the following applications: document management, content management, digitization, legal, business intelligence, military intelligence, search engines results pre- and post-processing, archiving, source code comparisons, management of email servers, management of file servers.

Embodiment 32. The method according to Embodiment 31, wherein said applications are marketed as a stand alone application.

Embodiment 33. The method according to Embodiment 31, wherein said applications are marketed as OEM.

Embodiment 34. A method for determining that a document A is a candidate for near duplicate to at least one other document B, comprising:
i) providing at least two different bounded functions/on document, and for each classifier providing a vector with n buckets where n is a function of th, each of size Hn
ii) receiving the document A, associating a unique document id to the document, and calculating a list of features;
iii) calculating a rank=f(A), where A being the list of features of the documents;
iv) add document id to buckets in the vector, as follows:
Floor ( $n^\vartheta$ rank) (if greater than zero, otherwise discard this option), Floor( $n^\vartheta$ rank)+1, and Floor ( $n^\vartheta$ rank)+2 (if less than n, otherwise discard this option)
v) calculating union on documents id in the buckets, giving rise to set of documents id;
vi) applying (ii)-(v), in respect to a different classifier from among said at least two classifiers, giving rise to respective at least two sets of documents id;
vii) applying intersection to the at least two of the sets, stipulated in (vi), giving rise to at least two documents id, if any, being candidates for near duplicate.

Embodiment 35. The method according to Embodiment 34, wherein said list of features being 1-grams, 2-grams, 3-grams, . . . , n-grams, where n is selected.

Embodiment 36. The method according to Embodiment 34, further comprising applying at least one additional calculation phase in order to determine whether candidates of near duplicate objects meet a criterion for near duplicate objects.

Embodiment 37. The method according to Embodiment 36, wherein the additional calculation phase includes calculating the resemblance to verify the near-equivalence.

Embodiment 38. The method according to Embodiment 36, wherein additional calculation phase includes:
i) calculating intersection between two candidates for near duplicate objects by calculating number of shingles that are shared by the two;
ii) calculating union of two candidates for near duplicate objects by calculating number of shingles that reside in either objects;
iii) determining that the two objects are near duplicate by calculating intersection divided by union, and in case the result exceeds a predetermined value constituting said criterion, the objects are near duplicate.

Embodiment 39. The method according to Embodiment 38, further comprising, applying an optimization for discarding candidates for near duplicate objects having a shingle ratio that drops below said predetermined value.

Embodiment 40. The method according to Embodiment 36, wherein the at least one additional 5 calculation phase is slower than the calculation of candidates of near duplicate documents, for any two documents.

Embodiment 41. The method according to Embodiment 1, wherein said condition is implemented using bucket data structure.

Embodiment 42. A method for determining that at least one object B is a candidate for near 10 duplicate to an object A, comprising
i) providing at least two different functions on an object, each function having a numeric function value;
(ii) determining that at least one objects B is a candidate for near duplicate to an object A, if a condition is met, the condition includes: for any 15 function/from among said at least two functions, $|/7(A)-J7(B)|<\delta i$ (f,A), wherein $\delta i$ is dependent upon at least/and A.

Embodiment 43. A method for determining that at least one object B is a candidate for near duplicate to an object A, comprising
(i) providing at least two different functions on an object, each 20 function having a numeric function value;
(ii) determining that at least one objects B is a candidate for near duplicate to an object A, if a condition is met, the condition includes: for any function/from among said at least two functions a relationship between results of the function when applied to the objects meets a given score.

Embodiment 44. The method according to Embodiment 43, wherein said relationship being $I/(A)-/(B)I$, and said score being $\delta j$ (f,A), wherein $\delta i$ is dependent upon at least/and A, and wherein said condition is met if $|/(A)-/(B)|<\delta$; (fΛ).

Embodiment 45. A system for determining that at least one object B is a candidate for near duplicate to an object A, comprising: a storage providing at least two different functions on an object,
each function having a numeric function value;
a processor associated with said storage and configured to determine that at least one objects B is a candidate for near duplicate to an object A, if a condition is met, the condition includes: for any function $f_t$ from among said at least two functions, $|f_i(A)-f\phi)|<\delta j$ (f,A), wherein δi is dependent upon at least/and A.

Embodiment 46. The system according to Embodiment 45, wherein said determining that at least one object B is a candidate for near duplicate to an object A with a given similarity level th, and wherein said δj is further dependent upon th.

Embodiment 47. A system for determining that at least one object B is a candidate for near duplicate to an object A, comprising: a storage providing at least two different functions on an object, each function having a numeric function value;

a processor associated with said storage, configured to determine that at least one object B is a candidate for near duplicate to an object A, if a condition is met, the condition includes: for any function /J from among said at least two functions a relationship between results of the function when applied to the objects meets a given score.

Embodiment 48. A computer product comprising a storage for storing computer code portions capable of performing the method stages according to Embodiment 1.

Embodiment 49. A computer product comprising a storage for storing computer code portions capable of performing the method stages according to Embodiment 34.

Embodiment 50. A computer product comprising a storage for storing computer code portions capable of performing the method stages according to Embodiment 42.

Embodiment 51. A computer product comprising a storage for storing computer code portions capable of performing the method stages according to Embodiment 43.

Embodiment 52. The method according to Embodiment 1, wherein of said objects being voice data, and further comprising, converting said objects to respective text based documents.

Embodiment 53. The method according to Embodiment 34, wherein of said objects being voice data, and further comprising, converting said objects to respective text based documents.

Embodiment 54. The method according to Embodiment 42, wherein said objects being voice data, and further comprising, converting said objects to respective text based documents.

Embodiment 55. The method according to Embodiment 43, wherein said objects being voice data, and further comprising, converting said objects to respective text based documents.

Methods for Determining Near Duplicate "Noisy" Data Objects known at least from the PCT publications referenced above include at least the following embodiments:

Embodiment 1. A method for constructing a glossary operable to mask noise features in at least two documents that are similar in accordance with a criterion; the noise features being nominally identical features that appear differently in the documents, the method comprising:

a) providing a discrepancy list for the at least two documents that include the noise features; and b) constructing a glossary for masking the noise features utilizing at least the discrepancy list.

Embodiment 2. The method according to Embodiment 1, wherein said (b) includes (i) mapping noise features utilizing said discrepancy list to common mapped features and automatically adding said mapped features to the glossary.

Embodiment 3. The method according to Embodiment 2, wherein said (i) includes 1. identifying, utilizing said discrepancy list, a pair of noise features appearing in respective two documents;

2. in case that neither of said pair is in the glossary, mapping said pair of features to a common mapped feature and automatically adding said mapped feature to the glossary.

Embodiment 4. The method according to Embodiment 3, further including: determining if the pair of noise features are close in accordance with a predefined criterion, and if in the affirmative applying said (2).

Embodiment 5. The method according to Embodiment 4, wherein said determining if the features are close in accordance with a predefined criterion includes: applying an edit distance function between said features, where the function returns a value being a minimum number of operations such that said features become the same, and said predefined criterion is met if said returned value being equal or smaller than a predefined value.

Embodiment 6. The method according to Embodiment 3, wherein said mapping said pair of features to a common mapped feature includes applying Feature Mapping Function (FMF) in respect of said features, said FMF gets a feature in said document and returns said mapped feature.

Embodiment 7. The method according to Embodiment 6, wherein applying said (FMF) includes:

a. calculating the longest common substring (LCS) among features of the two documents;

b. based on computed LCS of first document and the first document, inserting all different features to a first vector, whereby a first different feature is in first entry of the first vector, and so on;

c. based on computed LCS of second document and the second document, inserting all different features to a second vector, whereby a first different feature is in first entry of the second vector and so on; and whereby sizes of said first and second vectors are identical; and d. for each entry i in said first vector and second vector, i. calculating edit distance between entry i in said first vector and second vector, and if the edit distance calculated value being equal or smaller than a predefined value, generating a mapped feature i, such that FMF (entry i of said first vector)=FMF (entry i of said second vector).

Embodiment 8. The method according to said Embodiment 7, wherein said FMF is applied to an entire document.

Embodiment 9. The method according to previous Embodiments wherein each feature is at least one word.

Embodiment 10. The method according to Embodiment 1, wherein said document that includes noise features is a document translated from a digital document that is obtained by scanning a source medium.

Embodiment 11. The method according to Embodiment 10, wherein said translated document is obtained using Optical Character Recognition technique.

Embodiment 12. The method according to Embodiment 11, further comprising maintaining a respective glossary per OCR or family of OCRs.

Embodiment 13. The method according to previous Embodiments wherein determination if said documents are similar in accordance with a criterion includes: (i) providing at least two different functions on an object, each function having a numeric function value;

(ii) determining that at least one document B is a candidate for near duplicate to an document A, if a condition is met, the condition including: for any function f, from at least two of said functions, $|f_i(A)-f(B)|<\delta$; (f,th), wherein δ; is dependent upon at least f,th Embodiment 14. The method according to Embodiment 3, further comprising utilizing a natural language dictionary for determining if said pair of words have a dictionary meaning and if in the affirmative, skipping said (2).

Embodiment 15. A method for searching data using features, comprising:
a. providing at least one feature for search data;
b. utilizing the glossary according to Embodiment 1, for masking at least one of said features, if any;
c. searching said data utilizing at least said masked features.

Embodiment 16. A method for masking noise errors in at least two documents wherein nominally identical features appear differently, the method comprising:
a) maintaining a glossary for mapping noise features in any of the documents to common mapped features;
b) comparing respective pairs of features in at least two documents; for each pair of features that differ by less than a predetermined threshold,
if none of the features appear in the glossary, mapping said pair of features to a common mapped feature and automatically adding the mapped feature to the glossary; or if at least one of the pair of features appears in the glossary, extracting from the glossary the common mapped feature and automatically replacing said feature by the common mapped feature.

Embodiment 17. The method according to Embodiment 16, further comprising applying said (b) in response to determining that said documents are similar in accordance with a criterion.

Embodiment 18. The method according to Embodiment 17, wherein said identifying at least one candidate document that is similar by at least a given threshold th to said document, comprising:
i) providing at least two different functions on an object, each function having a numeric function value;
(ii) determining that at least one document B is a candidate for near duplicate to a document A, if a condition is met, the condition includes: for at least two functions f, from among said functions, $|f(A)-f(B)| < S_1 (f,th)$, wherein $B_1$ is dependent upon at least/t/t.

Embodiment 19. The method according to Embodiment 16, further comprising: calculating a similarity set of documents such that a document is a member in the set if another document in the set exists, such that the similarity level between the two documents is at least TH %.

Embodiment 20. The method according to Embodiment 19, applicable to version control.

Embodiment 21. A method for masking noise features in a document wherein, owing to an error, at least one feature in the document is misrepresented and appears as a noise feature, the method comprising:
a) maintaining a glossary that maps noise features in documents to common mapped features;
b) identifying at least one candidate document that is similar by at least a given threshold to said document, and for every candidate document, determining a discrepancy list that includes noise features being nominally identical features that appear differently in the document and the candidate document;
c) utilizing the discrepancy list for comparing corresponding features that originate from the document and the candidate document respectively, and in the case that the corresponding features differ in less than a predetermined threshold, if the corresponding features appear in the glossary, automatically masking said features by replacing said corresponding features by said common mapped feature.

Embodiment 22. The method according to Embodiment 21, wherein said identifying at least one candidate document that is similar by at least a given threshold th to said document, comprising:
i) providing at least two different functions on an object, each function having a numeric function value;
(ii) determining that at least one document B is a candidate for near duplicate to a document A, if a condition is met, the condition includes: for at least two functions β from among said functions, $|f_j(A)-f_j(B)| < \delta_j (f,th)$, wherein $\delta j$ is dependent upon at least fth.

Embodiment 23. The method according to Embodiment 21, wherein, after masking, said document and candidate document become identical.

Embodiment 24. The method according to Embodiment 21, further comprising: calculating a similarity set of documents such that a document is a member in the set if exists another document in the set, such that the similarity level between the two documents is at least TH %.

Embodiment 25. The method according to Embodiment 24, applicable to version control.

Embodiment 26. A method for determining whether at least one document A is a candidate for near duplicate to a document B; at least two of said documents include noise features being nominally identical features that appear differently in the documents; the method comprising:
(a) maintaining (i) a glossary configured to map noise features to common mapped features and (ii) a repository storing documents A;
(b) applying a near-duplicate technique to document B and to at least one of said stored documents A, for determining at least one document A that is candidate for near duplicate to document B.
(c) for each one of at least one of said candidate documents A,
(i) utilizing the glossary, for said candidate document A and document B, for masking noise features, if any, by mapping said noise features into common mapped features, giving rise to masked documents;
(ii) determine resemblance between said masked documents.

Embodiment 27. The method according to Embodiment 26, wherein said (c)(i) further includes the following preliminary stage:
(1) identifying, in said candidate document and document B, at least one pair of noise features, if any, which do not appear in the glossary, and in respect of each pair, mapping said pair of features to a respective common mapped feature and automatically adding said mapped feature to the glossary.

Embodiment 28. The method according to Embodiment 27, wherein said (c)(i)(1)) comprises: providing a discrepancy list for the documents that includes the noise features; identifying, based on the discrepancy list, pairs of noise features appearing in the respective two documents; in respect of each identified pair: in case that none of the features in the pair is in the glossary, mapping said pair of features to a common mapped feature and automatically adding said mapped feature to the glossary.

Embodiment 29. The method according to Embodiment 26, wherein said (c)(1)) comprises: providing a discrepancy list for the documents that includes the noise features; identifying, utilizing said discrepancy list, pairs of noise features appearing in the respective two documents; in respect of each identified pair: in case that at least one of the features in the pair is in the glossary, automatically mapping the respective feature to the common mapped feature.

Embodiment 30. The method according to Embodiment 26, further including: determining if pair of noise features are close in accordance with a predefined criterion, and if in the affirmative applying said (c)(i) and c(ii).

Embodiment 31. The method according to Embodiment 30, wherein said determining if the features are close in accordance with a predefined criterion includes: applying an edit distance function between said features, where the function returns a value being a minimum number of operations such that said features become the same, and said predefined criterion is met if said returned value is equal or smaller than a predefined value.

Embodiment 32. The method according to Embodiment 31, wherein said mapping said pair of features to a common mapped feature includes applying Feature Mapping Function (FMF) in respect of said features, said FMF gets a feature in said document and returns said mapped feature.

Embodiment 33. The method according to Embodiment 32, wherein applying said (FMF) includes:
a. calculating the longest common substring (LCS) among features of the two documents;
b. based on computed LCS of first document and the first document, inserting all different features to a first vector, whereby a first different feature is in first entry of the first vector, and so on;
c. based on computed LCS of second document and the second document, inserting all different features to a second vector, whereby a first different feature is in first entry of the second vector and so on; and whereby sizes of said first and second vectors are identical; and
d. for each entry i in said first vector and second vector,
ii. calculating edit distance between entry i in said first vector and second vector, and if the edit distance calculated value is equal or smaller than a predefined value, generating a mapped feature i, such that FMF (entry i of said first vector) =FMF (entry i of said second vector).

Embodiment 34. The method according to said Embodiment 33, wherein said FMF is applied to an entire document.

Embodiment 35. The method according to Embodiment 26, wherein each feature is at least one word.

Embodiment 36. The method according to Embodiment 26, wherein said document that includes noise features being a document translated from a digital document that is obtained by scanning a source medium.

Embodiment 37. The method according to Embodiment 36, wherein said translated document is obtained using Optical Character Recognition technique.

Embodiment 38. A method for determining whether at least one masked document A is a candidate for near duplicate to a document B; at least two of said documents include noise features being nominally identical features that appear differently in the documents; the method comprising:
(a) maintaining (i) a glossary configured to map noise features to common mapped features, and (ii) a repository storing masked documents A;
(b) utilizing the glossary, for said document B, for masking noise features, if any, by mapping said noise features into common mapped features, giving rise to masked document B;
(c) applying a near-duplicate technique to the masked documents, for determining at least one masked document A that is a candidate for near duplicate to the masked document B;
(d) for each one of at least one of said candidate documents A,
(i) utilizing the glossary, for said candidate document A and masked document B, for masking noise features, if any, by mapping said noise features into common mapped features, giving rise to masked documents;
(ii) determine resemblance between said masked documents; and above threshold,
(iii) identifying, in said document and masked document B, at least one pair of noise features, if any, which do not appear in the glossary, and in respect of each pair, mapping said pair of features to a respective common mapped feature and automatically adding said mapped feature to the glossary.

Embodiment 39. The method according to Embodiment 38, wherein said (d)(iii) comprises: providing a discrepancy list for the documents that includes the noise features; identifying based on the discrepancy list pairs of noise features appearing in the respective two documents; in respect of each identified pair: in the case that none of the features in the pair is in the glossary, mapping said pair of features to a common mapped feature and automatically adding said mapped feature to the glossary.

Embodiment 40. The method according to Embodiment 38, wherein said (b), comprises: providing a discrepancy list for the documents that includes the noise features; identifying based on the discrepancy list pairs of noise features appearing in the respective two documents; in respect of each identified pair: in case that at least one of the features in the pair is in the glossary, automatically mapping the respective feature to the common mapped feature.

Embodiment 41. The method according to Embodiment 38, wherein said (d)(i), comprises: providing a discrepancy list for the documents that include the noise features; identifying based on the discrepancy list pairs of noise features appearing in the respective two documents;
in respect of each identified pair: in case that at least one of the features in the pair is in the glossary, automatically mapping the respective feature to the common mapped feature.

Embodiment 42. The method according to Embodiment 38, wherein said (d)(i) and d(iii) further includes:
determining if pair of noise features are close in accordance with a predefined criterion.

Embodiment 43. The method according to Embodiment 42, wherein said determining if the features are close in accordance with a predefined criterion includes: applying an edit distance function between said features, where the function returns a value being a minimum number of operations such that said features become the same, and said predefined criterion is met if said returned value is equal or smaller than a predefined value.

Embodiment 44. The method according to Embodiment 43, wherein said mapping said pair of features to a common mapped feature includes applying Feature Mapping Function (FMF) in respect of said features, said FMF gets a feature in said document and returns said mapped feature.

Embodiment 45. The method according to Embodiment 44, wherein applying said (FMF) includes:
a. calculating find the longest common substring (LCS) among features of the two documents;
b. based on computed LCS of first document and the first document, inserting all different features to a first vector, whereby a first different feature is in first entry of the first vector, and so on;
c. based on computed LCS of second document and the second document, inserting all different features to a second vector, whereby a first different feature is in first entry of the second vector and so on; and whereby sizes of said first and second vectors are identical; and
d. for each entry i in said first vector and second vector, i. calculating edit distance between entry in said first vector and second vector, and if the edit distance calculated value being equal or smaller than a predefined value, generating a mapped feature i, such that FMF (entry i of said first vector)=FMF (entry i of said second vector).

Embodiment 46. The method according to said Embodiment 45, wherein said FMF is applied to an entire document.

Embodiment 47. The method according to Embodiment 38, wherein each feature is at least one word.

Embodiment 48. The method according to Embodiment 38, wherein said document that includes noise features is a document translated from a digital document that is obtained by scanning a source medium.

Embodiment 49. The method according to Embodiment 48, wherein said translated document is obtained using Optical Character Recognition technique.

Embodiment 50. The method according to Embodiment 26, wherein said identifying at least one candidate document that is similar by at least a given threshold th to said document, comprising:

ii) providing at least two different functions on a document, each function having a numeric function value;

(ii) determining that at least one document B is a candidate for near duplicate to a document A, if a condition is met, the condition including: for at least two functions f, from among said functions, $|f(A)-f(B)|<\delta j$ (f,th), wherein $\delta$; is dependent upon at least/t/z.

Embodiment 51. The method according to Embodiment 38, wherein said identifying at least one candidate document that is similar by at least a given threshold th to said document, comprising:

i) providing at least two different functions on a document, each function having a numeric function value;

(ii) determining that at least one document B is a candidate for near duplicate to a document A, if a condition is met, the condition includes: for at least two functions f, from among said functions, $|./J(A)-/J(B)|<\delta j$ (f,th).

Embodiment 52. A system for constructing a glossary operable to mask noise features in at least two documents that are similar in accordance with a criterion; the noise features being nominally identical features that appear differently in the documents, the system comprising:

means for providing a discrepancy list for the at least two documents that include the noise features; and constructing system for constructing a glossary for masking the noise features utilizing at least the discrepancy list.

Embodiment 53. A system for determining whether at least one document A is a candidate for near duplicate to a document B; at least two of said documents include noise features being nominally identical features that appear differently in the documents; the system comprising:

a glossary; configured to map noise features to common mapped features;

a repository storing documents A;

near-duplicate module configured to process said document B and at least one of said stored documents A, for determining at least one document A that is candidate for near duplicate to document B;

a system configured to be applied to for each one of at least one of said candidate documents A, and capable of (i) utilizing the glossary, for said candidate document A and document B, for masking noise features, if any, by mapping said noise features into common mapped features, giving rise to masked documents;

(ii) determine resemblance between said masked documents.

Embodiment 54. A system for determining whether at least one masked document A is a candidate for near duplicate to a document B; at least two of said documents include noise features being nominally identical features that appear differently in the documents; the system comprising:

a glossary configured to map noise features to common mapped features;

a repository storing masked documents A;

a system configured to utilize the glossary, for said document B, for masking noise features, if any, by mapping said noise features into common mapped features, giving rise to masked document B;

a near-duplicate module to the masked documents, for determining at least one masked document A that is candidate for near duplicate to the masked document B;

a system configured to be applied to for each one of at least one of said candidate documents A, and capable of:

(i) utilizing the glossary, for said candidate document A and masked document B, for masking noise features, if any, by mapping said noise features into common mapped features, giving rise to masked documents;

(ii) determine resemblance between said masked documents; and above threshold, (iii) identifying, in said document and masked document B at least one pair of noise features, if any, which do not appear in the glossary, and in respect of each pair, mapping said pair of features to a respective common mapped feature and automatically adding said mapped feature to the glossary.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for computerized batching of huge populations of electronic documents, including
computerized assignment of electronic documents into at least one sequence of electronic document batches such that each document is assigned to a batch in the sequence of batches and such that absent conflict between batching requirements, the following batching requirements being maintained by a suitably programmed processor:
a. pre-defined subsets of documents are always kept together in the same batch
b. batches are equal in size
c. the population is partitioned into clusters and all documents in any given batch belong to a single cluster rather than to two or more clusters,
the method also comprising filling batches, separately for each of several clusters, including first using large keep-together sets as batches and then combining keep-together sets other than the large sets into batches and finally ordering the resulting batches into a sequence according to urgency.

2. The method according to claim 1 wherein absent conflict between batching requirements, the following batching requirement is also maintained: positions of documents within the sequence of batches are determined by the document's pre-known urgency for review such that highly urgent documents appear in early batches and less urgent documents appear in later batches.

3. The method according to claim 1 and also comprising computing an urgency score for at least one keep-together set which represents an attribute such as a central tendency of the urgency scores of all documents in the keep-together set.

4. The method according to claim 3 wherein said urgency score of said set comprises a mode (most frequently occurring) urgency score of all documents in the set.

5. The method according to claim 1 and also comprising filling batches, separately for each of several clusters, including first combining keep-together sets other than very small sets into batches and subsequently passing over the batches in an order determined by known urgency and enlarging at least some of the batches by adding the very small sets thereto, in the order determined by known urgency.

6. The method according to claim 5 wherein the very small sets comprise keep-together sets including only a single document.

7. The method according to claim 1 wherein requirement (a) (keep-together) takes precedence over (b) (equal size) such that documents with a uniform keep-together value are assigned to a single batch regardless of resulting size of the batch.

8. The method according to claim 1 wherein requirement (a) (keep-together) takes precedence over requirement (c)—that each batch include only documents belonging to a single cluster—in that an artificial intelligence functionality uniformizes the cluster id's of all documents having a single keep-together id.

9. The method according to claim 1 wherein due to conflict between requirements (b), (c), there is for at least one cluster, a batch of lesser size than other batches equal in size.

10. The method according to claim 1 wherein, due to conflict between requirements (a), (b), there is at least one batch of greater size than other batches equal in size.

11. A computer program product, comprising a non-transitory tangible computer readable medium having computer readable program code embodied therein, said computer readable program code adapted to be executed to implement the method of claim 1.

12. A method for computerized batching of huge populations of electronic documents, including
   computerized assignment of documents into at least one sequence of electronic document batches such that each document is assigned to a batch in the sequence of batches and such that absent conflict between batching requirements, the following batching requirements being maintained by a suitably programmed processor:
   a. pre-defined subsets of documents are always kept together in the same batch
   b. batches are equal in size
   c. positions of documents within the sequence of batches are determined by the document's pre-known urgency for review such that highly urgent e.g. highly relevant documents appear in early batches and less urgent e.g. less relevant documents appear in later batches,
   wherein requirement (a) (keep-together) takes precedence over requirement (c)—that each batch include only documents belonging to a single cluster—in that an artificial intelligence functionality uniformizes the cluster id's of all documents having a single keep-together id.

13. The method according to claim 12 wherein, due to conflict between requirements (a), (b), there is at least one batch of greater size than other batches equal in size.

14. The method according to claim 12 and also comprising computing an urgency score for at least one keep-together set which represents an attribute such as a central tendency of the urgency scores of all documents in the keep-together set.

15. The method according to claim 14 wherein said urgency score of said set comprises a mode (most frequently occurring) urgency score of all documents in the set.

16. The method according to claim 12 and also comprising filling batches, separately for each of several clusters, including first using large keep-together sets as batches and then combining keep-together sets other than the large sets into batches and finally ordering the resulting batches into a sequence according to urgency.

17. The method according to claim 12 and also comprising filling batches, separately for each of several clusters, including first combining keep-together sets other than very small sets into batches and subsequently passing over the batches in an order determined by known urgency and enlarging at least some of the batches by adding the very small sets thereto, in the order determined by known urgency.

18. The method according to claim 17 wherein the very small sets comprise keep-together sets including only a single document.

19. The method according to claim 12 wherein requirement (a) (keep-together) takes precedence over (b) (equal size) such that documents with a uniform keep-together value are assigned to a single batch regardless of resulting size of the batch.

20. A computer program product, comprising a non-transitory tangible computer readable medium having computer readable program code embodied therein, said computer readable program code adapted to be executed to implement the method of claim 12.

21. A system for computerized batching of huge populations of electronic documents, the system including:
   apparatus for computerized assignment of documents into at least one sequence of batches; and
   a processor for controlling said computerized assignment such that each document is assigned to a batch in the sequence of batches and such that there is no conflict between batching requirements, the following batching requirements being maintained:
   a. pre-defined subsets of documents are always kept together in the same batch
   b. batches are equal in size
   c. the population is partitioned into clusters and all documents in any given batch belong to a single cluster rather than to two or more clusters,
   the processor being operative for filling batches, separately for each of several clusters, including first combining keep-together sets other than very small sets into batches and subsequently passing over the batches in an order determined b known urgency and enlarging at least some of the batches by adding the very small sets thereto, in the order determined by known urgency.

22. A system for computerized batching of huge populations of electronic documents, the system including:
   apparatus for computerized assignment of documents into at least one sequence of batches; and
   a processor for controlling said computerized assignment such that each document is assigned to a batch in the sequence of batches and such that in the absence of conflict between batching requirements, the following batching requirements are maintained:
   a. pre-defined subsets of documents are always kept together in the same batch
   b. batches are equal in size
   c. positions of documents within the sequence of batches are determined by the document's pre-known urgency for review such that highly urgent documents appear in early batches and less urgent e.g. less relevant documents appear in later batches,
   the processor being operative for filling batches, separately for each of several clusters, including first combining keep-together sets other than very small sets into batches and subsequently passing over the batches in an order determined by known urgency and enlarging at least some of the batches by adding the very small sets thereto, in the order determined by known urgency.

23. A system for computerized batching of huge populations of electronic documents, the system including:
   apparatus for computerized assignment of documents into at least one sequence of batches; and
   a processor for controlling said computerized assignment such that each document is assigned to a batch in the sequence of batches and such that there is no conflict between batching requirements, the following batching requirements being maintained:
   a. pre-defined subsets of documents are always kept together in the same batch
   b. batches are equal in size
   c. the population is partitioned into clusters and all documents in any given batch belong to a single cluster rather than to two or more clusters,
   the processor being operative for filling batches, separately for each of several clusters, including first using large keep-together sets as batches and then combining keep-together sets other than the large sets into batches and finally ordering the resulting batches into a sequence according to urgency.

24. The system according to claim 23 wherein absent conflict between batching requirements, the following batching requirement are also maintained: positions of documents within the sequence of batches are determined by the document's pre-known urgency for review such that more urgent documents appear in early batches and less urgent documents appear in later batches.

* * * * *